United States Patent
Braford, Jr.

(10) Patent No.: US 6,202,814 B1
(45) Date of Patent: Mar. 20, 2001

(54) AUTOMATIC TRANSMISSION HAVING GROUNDED CLUTCH WITH CONVERGENT COOLING

(75) Inventor: Thomas E. Braford, Jr., Brighton, MI (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/379,405

(22) Filed: Aug. 24, 1999

(51) Int. Cl.$^7$ .................................................... F16D 13/72
(52) U.S. Cl. ................................ 192/70.12; 192/85 AA; 192/113.34; 188/71.6; 188/264 E
(58) Field of Search ........................ 192/70.12, 85 AA, 192/113.34, 113.35, 113.36; 188/71.6, 264 E

(56) References Cited

U.S. PATENT DOCUMENTS

| | | |
|---|---|---|
| 4,736,821 * | 4/1988 | Reis ....................................... 188/71.6 |
| 5,174,420 | 12/1992 | DeWald . |
| 5,791,447 | 8/1998 | Lamela . |
| 5,806,645 | 9/1998 | Bhookmohan . |
| 5,810,412 | 9/1998 | Hall . |
| 5,813,508 | 9/1998 | Shoji . |
| 5,911,292 * | 6/1999 | Schade et al. ..................... 192/70.12 |
| 5,921,361 * | 7/1999 | Sommer ........................ 192/70.12 X |

* cited by examiner

Primary Examiner—Richard M. Lorence
(74) Attorney, Agent, or Firm—Reising, Ethington, Barnes, Kisselle et al.; Greg Dziegielewski

(57) ABSTRACT

A friction device includes a fixed housing and a driven member which ise rotatable about a common axis. The assembly also includes a friction disc pack operable to connect and disconnect the driven member for transferring and interrupting torque therebetween. A piston assembly is supported in the clutch housing and defines an expandable chamber. The piston assembly is responsive to the pressure of fluid in the expandable chamber to move between disengaged and engaged positions thereby actuating the pack to connect and disconnect the driven member. The pack is disposed within a grounded housing that includes a sealed circumferentially arranged opening defining a coolant chamber for supplying convergent flow cooling to the pack from the OD to the ID thereof.

3 Claims, 2 Drawing Sheets

AUTOMATIC TRANSMISSION HAVING GROUNDED CLUTCH WITH CONVERGENT COOLING

FIELD OF THE INVENTION

The present invention relates, generally, to friction devices such as clutch or brake assemblies for use in transmissions, differentials or brake systems. More specifically, the present invention relate to a multi-disk friction clutch or brake system having selectively actuated lubrication for convergently cooling the clutch on demand.

DESCRIPTION OF THE RELATED ART

Multi-disk friction devices are employed in a wide range of applications as clutches or brakes. For example, such friction devices are frequently used in land-based vehicles. Generally speaking, land vehicles require three basic components. These components include a power plant (such as an internal combustion engine), a powertrain and wheels. The powertrain's main component is typically referred to as the "transmission." Engine torque and speed are converted in the transmission in accordance with the tractive-power demand of the vehicle. Transmissions include one or more gear sets, which may include an inner sun gear, intermediate planet gears that are supported by their carriers and outer ring gears. Various components of the gear sets are held or powered to change the gear ratios in the transmission. The multi-disk pack clutch is a friction device, which is commonly employed as a holding mechanism in a transmission or differential. In addition, multi-disk friction devices also find use in industrial applications, such as wet brakes, for example, to brake the wheels on earth moving equipment.

The multi-disk pack clutch or brake assembly has a clutch sub-assembly including a set of plates and a set of friction disks, which are interleaved between one another. The plates and friction disks are bathed in a continual flow of lubricant and in "open pack" operation normally turn past one another without contact. The clutch or brake assembly also typically includes a piston. When a component of a gear set is to be held, as for example during a particular gear range, a piston is actuated so as to cause the plates and friction disks to come in contact with respect to one another. In certain applications, it is known to employ several multi-disk pack friction devices in combination to establish different drive connections throughout the transmission or differential to provide various gear ratios in operation, or to brake a component.

The confronting faces of the interleaved plates and friction disks are covered with frictional surfaces. When a friction device is engaged, kinetic energy is converted into thermal energy and a considerable amount of heat is generated. If the frictional surfaces get too hot, they can burn which damages the friction surfaces and degrades the clutch or brake operational effectiveness. Accordingly, the heat generated when a friction device is engaged must be dissipated.

Multi-disk friction clutches and brake systems have traditionally relied on a continuous "splash" supply of coolant, typically automatic transmission fluid (AFT), to remove the heat generated during operation. Coolant is supplied at or near the inner diameter of the disks and moves radially outward across the friction surface under the influence of centrifugal forces. While the centrifugal forces are important to move the coolant between the engaged friction disks, because the perimeter of the plates is larger at the outer diameter than the inner diameter, the coolant tends to break up into droplets which reduces wetting of the friction surfaces and concomitantly reduces the cooling capacity of the fluid.

When the disks are not engaged, little or no cooling is usually required. However, which conventional cooling schemes employed in the related art, unneeded coolant is often supplied to the open clutch or brake. When this occurs, the coolant in the friction device is sheared by the interleaved plates and friction disks due to the differential rotational speeds of the drive and driven members which the clutch or brake bridges. This condition reduces the efficiency of the transmission through viscous shear losses in the fluid and ultimately results in lower fuel efficiency.

Additionally, when coolant is directed toward a friction device operating in an open pack mode wherein coolant is not needed, the coolant is not being used by friction devices, which are engaged or otherwise require cooling. This also increases the volume of oil needed for a given transmission, differential or brake system and unnecessarily requires increasing the capacity of the associated pump.

It is known in the related art to selectively provide coolant to the clutch pack when the friction device has been engaged and to selectively interrupt coolant to the clutch pack when the friction device is disengaged. However, in general, the systems that have been proposed in the related art suffer from the disadvantage that they are overly complex in operation or are too difficult to be manufactured in a cost-effective manner. Examples of such arrangements are set-forth in U.S. Pat. Ser. Nos. 5,755,314; 5,791,447; 5,810,412 and 5,813,508.

Accordingly, there remains a need in the art for a friction device which may be selectively cooled on demand using forced coolant flow such as when the clutch or brake is engaged and wherein coolant to the clutch or brake may be selectively interrupted when not needed, such as when the clutch or brake is disengaged. Additionally, there is a need in the art for such a friction device having a cooling scheme wherein the friction disk are fully wetted when they are engaged.

In copending U.S. application Ser. No. 09/153,582, commonly assigned a clutch pack is interposed between the drive and driven members and is operable to connect and disconnect the drive and driven members for transferring and interrupting torque therebetween. A piston assembly is supported in the clutch housing and defines an expandable chamber between the piston assembly and the clutch housing. A source of pressurized fluid is in communication with the expandable chamber. The piston assembly is responsive to the pressure of fluid in the expandable chamber to move between disengaged and engaged positions thereby actuating the clutch pack to connect and disconnect the drive and driven members.

The piston assembly includes a main body having an outer ring annularly disposed about the main body. The outer ring includes at least one orifice extending through the outer ring. The outer ring is movable between a first position wherein the orifice is closed and the drive and driven members are disconnected and a second position wherein the orifice is open to allow flow of pressurized fluid through the orifice and into contact with the clutch pack thereby cooling the clutch pack when the drive and driven members are operatively connected through the clutch pack.

Thus, the piston assembly is operable to control the flow of coolant under pressure from the outer diameter of the clutch pack between the adjacent plates and disks to the inner diameter of the clutch pack to cool same when the drive and driven members are connected. Further, the piston assembly is also operable to stop the flow of pressurized coolant and to evacuate the clutch pack when the drive and driven members are disconnected.

In this way, the friction device provides coolant to the clutch pack when coolant is needed, such as when the clutch or brake is engaged, and interrupts coolant to the clutch pack when the coolant is needed, such as when the clutch or brake is disengaged. However, such an arrangement utilizes the piston apply fluid as the coolant fluid and as a consequence the application of cooling fluid across the friction discs is limited to the time period that the piston is operated.

In certain cases the time required to cooling the friction discs of an operating friction coupling can exceed the piston application time. For example, the friction coupling components for a second gear setting still may require cooling as the transmission is upshifts to third or fourth gear.

SUMMARY OF THE INVENTION

In order to provide that the friction couplings are cooled for an adequate period by convergent flow patterns across the friction discs of a friction coupling, the present invention includes a convergent feed system directly connected to a separate source of coolant that is controlled separate of friction coupling operation.

A feature of the invention is that such convergent flow is provided by connecting a separate source of coolant under the control of a solenoid operated control valve that will control the coolant for a time period independent of period that the a friction coupling is actuated.

A further feature is to provide such convergent cooling of a friction coupling having a friction coupling housing supported and sealed with respect to a transmission case to form a flow path for convergently cooling the friction discs of the friction coupling.

A still further feature is to provide such a flow path providing a sealed annulus between the a friction coupling housing and an outer transmission casing and wherein the sealed annulus is connected to a solenoid controlled source of coolant fluid and includes an annular wall having a plurality of radially inwardly directed ports for providing a convergent flow of a dedicated source of coolant as a convergent flow pattern wherein the friction discs of a friction disc pack have a flow of coolant from the outer diameter thereof to the inner diameter thereof.

The advantages of such an arrangement is that friction actuation pressure can be separated from coolant flow in a friction device such as a clutch or brake assembly thereby making enabling the period for cooling the fiction device to be independent of the period during which the friction device is applied.

BRIEF DESCRIPTION OF THE DRAWINGS

Other advantages of the invention will be readily appreciated, as the same becomes better understood by reference to the following detailed description when considered in connection with the accompanying drawings, wherein.

DETAILED DESCRIPTION OF THE PREFERRED EMBODIMENT(S)

Figure 1:
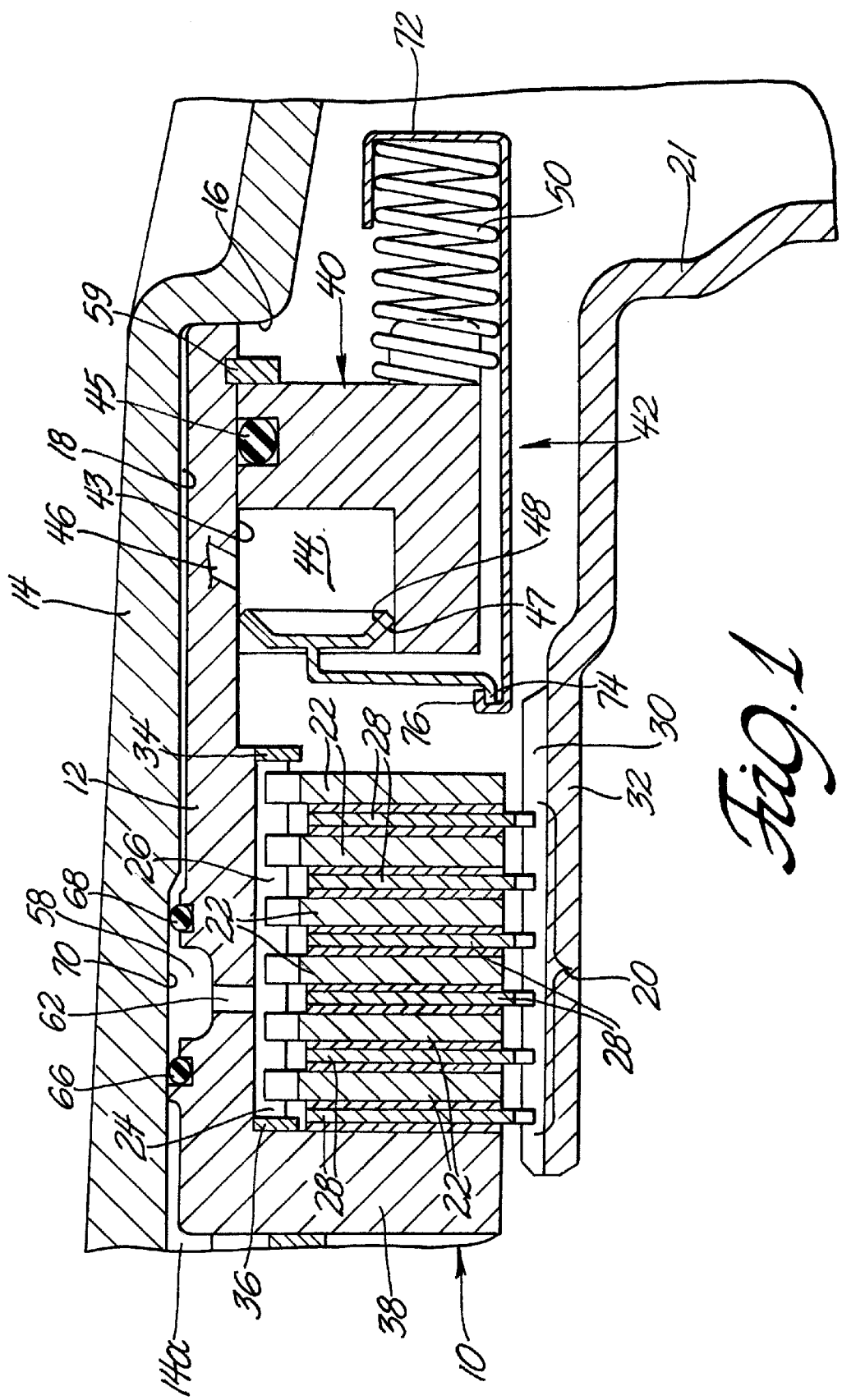
FIG. 1 is a partial cross-sectional side view illustrating a friction device of the present invention cooled by a source of convergent coolant that embodies a sealed annulus between a drop-in clutch housing and an outer transmission case.
Figure 2:
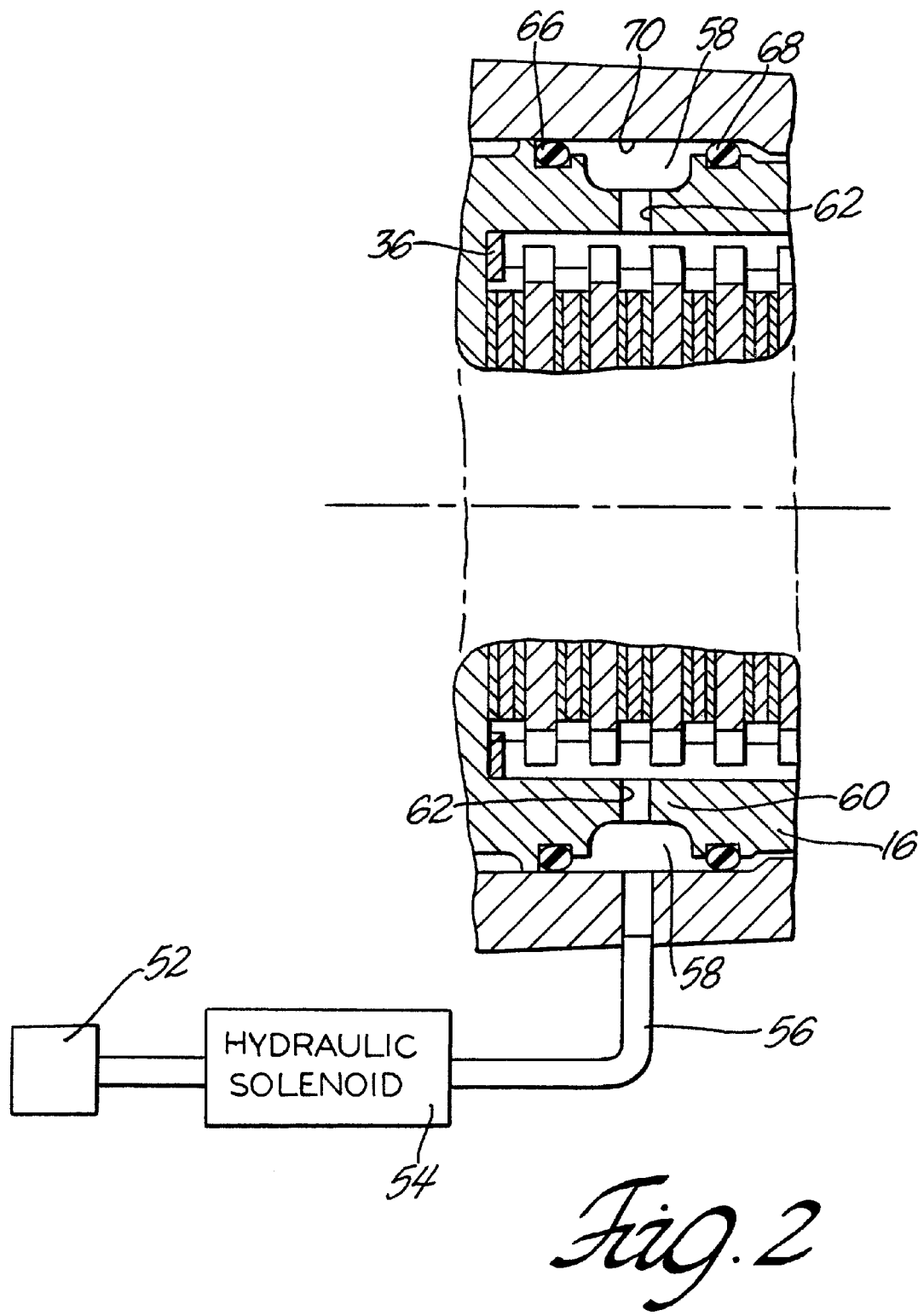
FIG. 2 is a section view taken along the line 2—2 looking in the direction of the arrows.

Referring now to FIG. 1, a friction coupling device 10. The friction device 10 is adapted to be employed in connection with a transmission, differential or brake system. For example only and not by way of limitation, as is commonly known in the art, but not shown in these figures, transmission assemblies typically include an input shaft which is operatively coupled to a prime mover, such as an internal combustion engine. In an automotive application, the transmission assembly also includes an output shaft, which is operatively coupled to driven wheels through other drivetrain components such as a drive shaft and an axle having a differential. At least one, and often a plurality of, gear sets is operatively coupled between the input and output shafts. The transmission casing supports the input shaft, the output shaft and the gear sets of the transmission assembly.

Various components of the gear sets are held or powered to change the gear ratio in the transmission. To this end, the transmission assembly will typically include at least one friction device 10. However, it will be appreciated by those having ordinary skill in the art that the transmission assembly may employ any number of friction devices adapted to hold or power gear sets to change the gear ratio of the transmission. Further, and notwithstanding the automotive related context of the discussion above, from the description that follows, those having ordinary skill in the art will appreciate that the present invention may be employed in a transmission, differential or brake system whether used in an automotive, non-automotive or industrial application. Thus, to the extent the term "clutch" is used below in any context, this term should be given its broadest possible meaning including, but not limited to, clutches and brakes for use in transmissions, differential or braking systems of all types.

The friction device 10 includes a housing 12 that is supported within the outer casing 14 of a multi-speed automatic transmission. More particularly, in the illustrated arrangement the housing 12 has in inboard end thereon engaged with a shoulder 16 on the inside surface 18 of the outer casing 14.

An annular clutch packs, one half of which is generally indicated by the bracket labeled at 20 is interposed between the grounded member 12 and driven member 22 and is operated to connect and disconnect the grounded member and a driven members 21 for translating and interrupting torque therebetween. The clutch pack 20 includes a plurality of annular plates 22 splined at 24 to the clutch housing splines 26. A plurality of annular friction disks 28 is splined at 30 to a driven carrier hub 32 and interleaved between the plates 22. Together, the plates 22 and disks 28 of the annular clutch pack 20 define an outer diameter roughly at the spline 24 of the drive hub 26 and an inner diameter roughly at the splines 30 of the driven hub 32.

When disengaged, the plate 22 and friction disks 28 rotate past one another in non-contacting relationship. The plates 22 and friction disks 28 are also axially movable relative to their respective splines 26, 30 to come into frictional engagement, thereby reducing or eliminating relative rotation between the plates 22 and disks 28.

A pair of retaining rings 34, 36 are mounted to the housing 16 on either side of the clutch pack 20. When the disks and plates are engaged, the clutch pack 20 is sealed at its outer diameter by the clutch housing 16 end 38 and a seal gland 40.

The axial movement of the discs 22, 28 is achieved through the actuation of a piston assembly, generally indicated at 42, which is supported in a bore 43 in the clutch housing 16. The bore 43 is sealed by seal 45 located in gland 40 and by seal 47 carried on a piston 48.

The piston assembly 42 and housing 16 cooperate to define an expandable chambers 44 in housing 16. A source of pressurized actuation or piston apply fluid is in communication with the expandable chamber via pressure port 46.

In accordance with one aspect of the invention the clutch housing 16 is a drop in housing that is grounded to the transmission case 14 at a rib 14a formed on the interior surface thereof.

The piston assembly 42, is responsive to the pressure of fluid in the expandable chamber 44 to move between disengaged and engaged positions thereby actuating the clutch pack 20 to connect and disconnect driven member 21.

A biasing member generally indicated at 50 is employed to move the piston assembly 42 to its disengaged position.

In accordance with the present invention a separate source of coolant 52 is connected by a solenoid operated control valve 54 to a conduit 56 that supplies an annular cavity 58 formed by an annular wall 60 in the housing 12. The inlet for the convergent flow of coolant through the friction discs 28 from the OD to the ID thereof is through a series of circumferentially spaced ports 62 that communicate the cavity 58 with the OD of the pack 20. The clutch housing 16 carries two axially spaced annular O-rings 66, 68 that seal against an annular inboard surface 70 of the transmission case 14.

As a consequence, an easily assembled coolant supply arrangement is set-forth wherein a unitary drop in assembly includes the components for providing a source of convergent coolant flow from the OD to the ID of the clutch pack. Such an arrangement enables the friction coupling to be cooled even when the friction discs are released as for example following a shift from a lower speed range to a higher speed range prior to the time required for cooling the heat build-up within a friction coupling engaged during the lower speed range but released upon operation in the higher speed ranges.

As illustrated in FIG. 1 the biasing member 50 is a disc spring that is biased between a grounded snap ring 59 and the piston 48. The biasing member 50 is a return spring assembly 50 that can have one or more coiled springs. One coiled spring 50 is shown captured within a retainer 72 with one end of the spring 50 biased against the piston at a bent segment 74 thereon engaged by a bent end 76 on the retainer 72. It will be appreciated by those having ordinary skill in the art that the roles of the expandable chambers and biasing members may be reversed such that the biasing members are employed to engage the clutch pack 20. Further, it will also be appreciated that the biasing members may include any biasing mechanism conventionally known in the art and is not limited to disc or coil springs.

As alluded to above, just before the clutch pack 20 is engaged by movement of a piston flange 74 against a outer plate 22, the plates 22 and disks 28 come into frictional contact with one another until the relative rotational speed between the plates 22 and disks 28 become zero. In this disposition, the plates 22 and disks 28 are either rotating together at one speed or are both held against rotation, depending on the particular application in a transmission, differential or brake system. In any case, during the engagement of the plates 22 and disks 28, kinetic energy is converted to thermal energy and a considerable amount of heat is generated. This heat must be dissipated.

To this end, the solenoid valve 54 is controlled to connect the independent coolant source 52 with the coolant cavity 58 defined between the drop in housing 16 and the transmission case 14 so as to allow flow of pressurized coolant fluid across the clutch pack 20. pressure fills the outer diameter to the inner diameter of the clutch pack 20 between seals 36, 41. Each of the plates 22 and friction disks 28 may include grooves to facilitate cooling of the frictional surfaces. The flow of coolant under pressure from the outer diameter to the inner diameter of the clutch pack ensures full wetting of the frictional surfaces and this improves the cooling efficiency of the clutch. Movement of the coolant by pressure ensures that the coolant will not degrade into droplets or otherwise atomize in the clutch pack 20. The pressurized fluid, typically ATF, thus cools the clutch pack 20 when the drive and driven members are operatively connected. Excess fluid may exit the clutch housing 16 via gravity when the cooling cycle is ended by closing the valve 54.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

What is claimed is:

1. A friction device comprising:

a fixed housing and a driven member;

a friction coupling having a friction disc pack interposed between said fixed housing and said driven member and operable to connect and disconnect said driven member for transferring and interrupting torque therebetween;

a piston assembly supported in said fixed housing and defining an expandable chamber between said piston assembly and said fixed housing;

a first source of pressurized fluid in communication with said expandable chamber, said piston assembly being responsive to the pressure of fluid in said expandable chamber to move between disengaged and engaged positions thereby actuating said friction disk pack to connect and disconnect said driven member;

said fixed housing configured as a drop in housing; a transmission case for receiving said drop in housing and seal means interposed between said drop in housing and said transmission case for defining a coolant chamber between said drop in housing and said transmission case;

a second source of pressurized fluid in communication with said coolant chamber;

and orifices that are open to the OD of said friction disk pack to allow flow of said second source of pressurized fluid through said orifices and into contact with said friction disk pack thereby cooling same.

2. A friction device as set forth in claim 1 wherein said drop in housing has an annular groove in the OD thereof and spaced O-rings sealing on either side of said annular groove to direct coolant radially inwardly through said orifices.

3. A friction device as set forth in claim 1 wherein said transmission case includes an inboard sealing surface and said O-rings being slidably connected to said inboard sealing surface for sealing said coolant chamber radially inwardly of said transmission case and radially outwardly of said clutch packs.

* * * * *